April 4, 1961 — L. F. SCHERER — 2,977,993
NON-METALLIC PIPE END CLOSURE
Filed Nov. 27, 1957

United States Patent Office 2,977,993
Patented Apr. 4, 1961

2,977,993
NON-METALLIC PIPE END CLOSURE

Lewis F. Scherer, Houston, Tex., assignor to The Texas Pipe Line Company, Houston, Tex., a corporation of Texas Filed Nov. 27, 1957, Ser. No. 699,307

1 Claim. (Cl. 138—96)

This invention relates generally to pipes and specifically to protective closure means for the pipe ends or joints.

During the manufacture, shipment and ultimate utilization of pipe line sections, the ends are not only liable to injury but the interior of the pipes are subject to contamination by dirt, water and other foreign matter, as well as being exposed to varying weather conditions. Usually, the pipe is cleaned at the mill and should be kept clean until ready for use in transporting refined petroleum products which must not be contaminated. Furthermore, moisture should not be allowed to accumulate in the pipes, thereby reducing the chances for rust formation and other corrosive processes from arising.

Prior to World War II, pipe manufacturers shipped pipe with the ends sealed by a metallic cap which could be removed easily. This was done away with during the war and has not been resumed.

As a result, postwar shipments of pipe sections often have contained excessive amounts of rust, dirt and other foreign substances, because no means are provided to prevent the entrance of moisture and the like into the open ends of the pipes. When pipe lines are fabricated from such sections, the product transported through them must be filtered in order to remove the foreign substances which continue to come through the pipe line stream for some time.

Accordingly, it is an object of the invention to provide a new and improved means for protecting and closing the ends of pipe sections used in the petroleum fields.

Another object of the invention is to provide a novel and inexpensive means for protecting the open ends of a pipe.

Still another object of the invention is to provide, as a disposable item, a new and improved pipe end enclosure made of cheap material.

Figure 1:
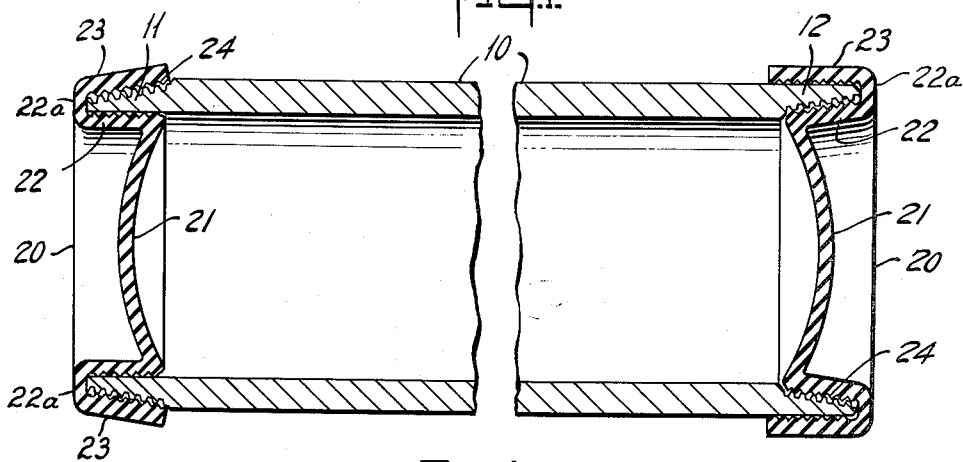

These and other objects, advantages and features of the present invention will become apparent from the following descripton of the invention and by reference to the accompanying drawing wherein:

Fig. 1 is a longitudinal sectional view of a drill pipe showing closures applied to the ends thereof.

Figure 1A:
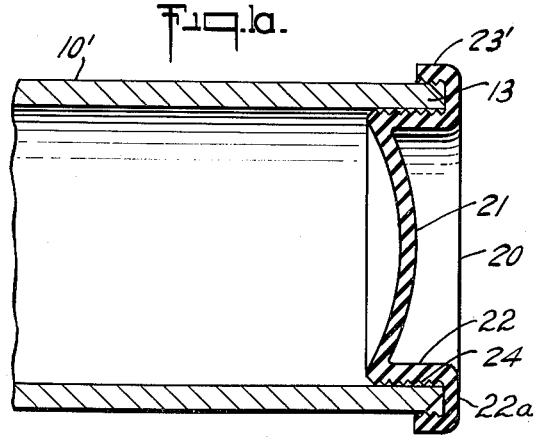
Figure 2:
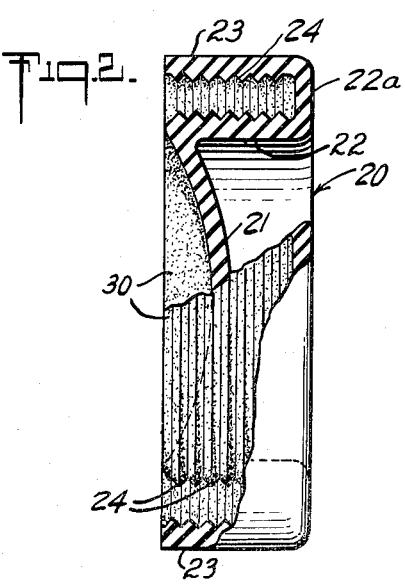

Fig. 1a is a partial sectional view showing a closure applied to a plain pipe end; and Fig. 2 is an enlarged cross section of a pipe cap or end closure showing the inner exposed surfaces with corrugations and impregnated with a vapor phase inhibitor. In accordance with the illustrated embodiments of my invention, there is disclosed a closure for pipe ends which is inexpensive to manufacture, both from form and material considerations, and which prevents internal contamination of the pipe from dust, water and the like, as well as serving as an end protector.

Referring to Fig. 1, a drill pipe is disclosed generally at 10, with non-metallic pipe caps or end closures at 20, 20, shown applied to the externally threaded pipe end at 11 and to the internally threaded pipe end at 12.

In Fig. 1a, the pipe cap 20 is shown applied to a plain end 13 of a pipe section 10'.

The pipe cap 20, shown in cross section in Fig. 2, is a flexible cup shaped member made of an inexpensive plastic, either natural or synthetic, e.g., reclaimed rubber, the bottom being integral and dished inwardly into concave-convex shape as shown at 21. Extending from the bottom as the side wall is the cylindrical inner skirt portion 22, which is sufficiently deep so that when the pipe cap is placed in operative position into a pipe end, the pipe handling hooks may contact the cylindrical inner skirt portion without rupture of the bottom.

The outer end of the cylindrical inner skirt portion has an outwardly extending flange or lip 22a, which supports the cylindrical outer skirt portion 23, which is substantially parallel to the inner skirt portion 22 and serves to cover the pipe end for its protection, as well as limiting the depth of insertion of the cap within a pipe end. For a more specific application, the pipe cap of Figure 1a, having a shorter outer skirt portion as shown at 23', can be used for the protection and closure of plain pipe ends.

In order to insure good contact with the unthreaded surfaces of pipe ends, the pipe contacting surfaces of the skirt portions of the end closure are corrugated, as at 24, so that they may grip irregularities on the contacted surfaces. Although corrugations would be necessary only on that surface which would contact the plain surface of the pipe end (or coupling), for economy purposes, it is expedient to corrugate both of the parallel pipe end contacting surfaces on the skirt portions. Thus, when the end closure is applied to a tapered end construction, as shown in Fig. 1, the flexibility of the skirt portions, together with the corrugations, ensure a good grip on the pipe end.

The closure for the pipe end is used also to prevent condensation of water vapor in the pipe. Even though pipe end closures may have been applied at the manufacturing plant, the air enclosed within a pipe 30 feet long contains considerable moisture. To counteract the presence of corrosion favoring factors in the pipe, such as would be caused by condensation of water vapor, I proposed to impregnate the pipe cap 20 with a vapor phase corrosion inhibitor, as indicated at 30. It has been found that urea, ammonium nitrite and sodium nitrite are some of the salts which are advantageous to serve this purpose. Such salts can be admixed with thermoplastic and thermosetting resins or may be impregnated on the inner exposed (contact) surfaces of the pipe cap during fabrication. Plastics which can be used include natural and synthetic rubbers, phenol and urea formaldehydes and polyethylene among others.

Thus, there has been shown and described, a means for preventing the contamination of the interior of a pipe, for which means there is great need in the oil fields. This means can be used on plain or threaded pipe ends or couplings and provides inexpensive protection against joint damage.

Obviously, many modifications and variations of the invention, as hereinbefore set forth, may be made without departing from the spirit and scope thereof, and therefore only such limitations should be imposed as are indicated in the appended claim.

I claim:

For use with pipe having open ends, the wall of said pipe at said ends tapering between the internal and external diameters of said pipe to define an annular cross section at said ends of diminishing wall thickness toward said open ends, a flexible closure of the character described comprising a one-piece pipe end protector formed of resilient plastic material of substantial thickness for slip-on engagement with a tapering pipe end, said end protector having a flexible integral concave-convex bottom of substantial curvature with the concave surface thereof exposed to the interior of the pipe when in closure position, an upstanding cylindrical inner skirt portion of uniform external and internal diameter integrally joined to said bottom, a lip at the outer end of said inner skirt portion extending outwardly substantially normal thereto, and a cylindrical outer skirt portion supported by said lip in substantially parallel relationship to said inner skirt portion and spaced opposite thereto, the outwardly extending lip being of such extent that the inner and outer cylindrical skirt portions, when applied to a pipe end, may be spread apart from their normal parallel relationship to each other to have frictional engagement along their contact surfaces with the inner and outer surfaces of the pipe at said pipe end, circumferential corrugations on both the inner wall of the outer skirt and the external wall of the inner skirt whereby said closure is adapted to be inserted over and to engage both the inner and outer wall faces of said pipe ends, said inner skirt portion being of such depth that pipe-handling hooks may make operating contact therewith without danger of rupture of said bottom, said plastic material having a vapor phase corrosion inhibitor admixed therewith.

References Cited in the file of this patent

UNITED STATES PATENTS

| | | |
|---|---|---|
| 889,872 | Conrad | June 2, 1908 |
| 1,906,182 | Riney | Apr. 25, 1933 |
| 2,717,843 | Wachter | Sept. 13, 1955 |
| 2,727,651 | Mickelson | Dec. 20, 1955 |
| 2,739,872 | Senkus | Mar. 27, 1956 |
| 2,826,222 | Case | Mar. 11, 1958 |